G. N. Stearns,
Hay Fork.
No. 99,120.  Patented Jan. 25, 1870.
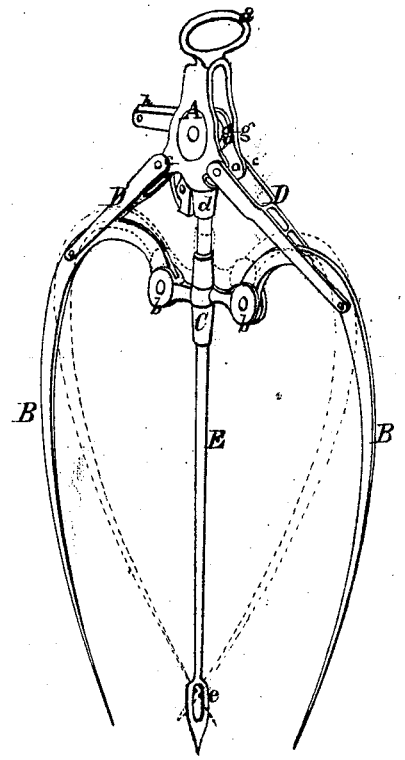
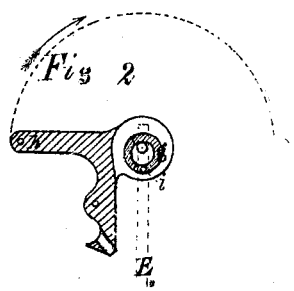
Oscar A. Dennis }
Alden E. Messinger } Witnesses
Geo. N. Stearns
Inventor

United States Patent Office.

GEORGE N. STEARNS, OF SYRACUSE, NEW YORK.

Letters Patent No. 99,120, dated January 25, 1870.

IMPROVEMENT IN HORSE HAY-FORKS.

The Schedule referred to in these Letters Patent and making part of the same.

*To all whom it may concern:*

Be it known that I, GEORGE N. STEARNS, of the city of Syracuse, in the county of Onondaga, in the State of New York, have invented a new and useful Improvement in Horse or Power Hay-Forks; and I do hereby declare the following is a full description thereof, reference being had to the accompanying drawings, forming a part of this specification, in which—

Figure 1 is a perspective view of the device embodying this invention.

Figure 2 is a side elevation of the cam and lever used to operate the needle.

The first part of my invention relates to the combination of the operating-arms and grasping-tines, and their arrangement with the other parts of the fork, which will cause the tines to close together gradually at their points, when being pressed down into the hay.

The second part is the combination, with the tines, links, and sleeve, of the needle, which needle is furnished with an eye, at or near its point, that is capable of receiving and holding the points of the tines, when closed together after being pressed into the hay.

The third part of my invention relates to the combination of a lever and cam with the needle, by which the said needle may be operated vertically, in either direction, either to bind or hold the points of the tines when crossed within the eye, when the said needle is raised, or to free the said point of the tines when dropped.

To enable others skilled in the art to make and use my invention, I describe it.

In the letters of reference marked thereon, the same letters indicate like parts.

In the drawings—

A represents the head of the fork.

*a* is the hoisting-link or eye, to which the hoisting-rope is to be fixed.

B B are the grasping-tines.

The tines B B (made of steel) are of suitable length, and are slightly curved from *x* to their points, while from *x* to the points of their principal connection with the sleeve of the fork, the said tines may be made curved, as in fig. 1, or made angular.

The said tines B B are hinged to the arms *b*, which start from the movable sleeve C.

Pivoted to the tines B B, at *x*, are the operating-arms or links, D D, which arms or links govern relatively the tines B B, and are connected with the head A, by means of the pivots *c*.

When thus arranged, the pivot *x* becomes the fulcrum on which the tines move, when the fork is operated, either in the act of entering the hay or discharging the same.

Running down vertically through the centre of the fork, is a tapering shaft, E, which I term the needle.

The said needle is provided with an eye, *e*, at or near its point, which is to receive the points of the tines B B, when the said tines have closed together after entering the hay, which said points of the tines B B will cross each other in the eye *e*, and be held thus crossed by the eye *e* of the needle, (the needle E being raised,) and when thus held, the result effected by the holding of the points of the tines B B together, as shown by dotted lines, will be substantially the same as if the tines B B were one continuous piece, as a band encircling the material being operated with.

To effect a vertical movement of the needle E in either direction, I employ an eccentric, $g$, shown in fig. 2.

In the head of the needle, just above the fixed sleeve *d*, is a pin, *i*, fig. 2, which works in the grooved eccentric *g*, which eccentric, when moved by the lever *h* in the direction shown by arrows in fig. 2, will throw the needle up, and carry with it the eye *e*, and lock the points of the tines together.

A reverse movement of the lever will cause the eccentric *g* to throw the needle down, and relieve the said points, so that the material being operated with will be discharged from the tines.

To operate with this fork, the operator thrusts the tines B B into the mass of material to be lifted or moved, which thrusting down will cause the tines (previously opened) to gradually close together as they enter the hay.

When driven down, and the tines closed, as shown by dotted lines in fig. 1, the lever *h* is thrown up, as shown by dotted lines in fig. 2, and moving the eccentric *g*, will throw the needle E up, and cause the eye *e* to engage with the points of the tines B B, which were free to enter the said eye *e*, when the needle E was down.

Being thus secured together, the mass to be lifted is substantially encircled by the clasping-tines, and can be raised up and moved in any direction, to be deposited, when a cord or tripping-rope, attached to the lever *h*, in position as shown in figs. 1 and 2, when the needle will be thrown down or tripped, and the points of the tines released from the eye *e*, and, being thus released, the tines will open by the weight of the mass lifted, and suffer it to fall out.

Having thus described my invention,

What I claim as new, and desire to secure by Letters Patent, is—

1. The tines B B, operated by links D D, and movable sleeve C, in combination with needle E, having eye *e*, substantially as described.

2. The combination of tines B B and vertically-movable needle E, having an eye, e, at or near its point, for the purpose of locking the tines, substantially as set forth.

3. The needle E, operated vertically, by means of the eccentric g, (or its equivalent cams,) and the lever h, substantially as and for the purpose set forth.

4. The combination and arrangement of the head A, links D D, tines B B, movable sleeve C, needle E, having eye e, cam g, and lever h, substantially as described.

GEO. N. STEARNS.

Witnesses:
OSCAR O. DENNIS,
ALMON C. MESSINGER.